United States Patent [19]

Wells et al.

[11] 4,042,296
[45] Aug. 16, 1977

[54] FILM CARTRIDGE

[75] Inventors: Thomas R. Wells, Des Plaines; Donald R. Jacobs, Niles, both of Ill.

[73] Assignee: Bell & Howell Company, Chicago, Ill.

[21] Appl. No.: 653,190

[22] Filed: Jan. 28, 1976

[51] Int. Cl.² .......................................... G03B 23/02
[52] U.S. Cl. ................................. 352/78 R; 242/192; 242/197
[58] Field of Search .............. 352/72, 78 R; 242/192, 242/197, 198

[56] References Cited

U.S. PATENT DOCUMENTS

| | | | |
|---|---|---|---|
| 3,558,077 | 1/1971 | Heinen | 352/78 R |
| 3,825,327 | 7/1974 | Kosarko | 352/72 |
| 3,892,477 | 1/1975 | Land | 352/72 |

*Primary Examiner*—Monroe H. Hayes
*Attorney, Agent, or Firm*—John R. Hoffman; Robert J. Schneider; John E. Peele, Jr.

[57] ABSTRACT

A film cartridge designed for permanent mounting on a movie projector having an automatic feed mechanism. The cartridge includes a generally rectangular housing for enclosing the entire film reel. A reciprocating spindle is slidably mounted by a pair of pins to captivate the film reel in an approximately precise orientation to permit the automatic feed mechanism to strip the leading edge from the reel and guide the leading edge into the machine. The reciprocal movement of the spindle is accomplished by a cam slot provided in a sliding cover permitting the insertion and removal of film reels without the expense of a cassette for each reel.

10 Claims, 6 Drawing Figures

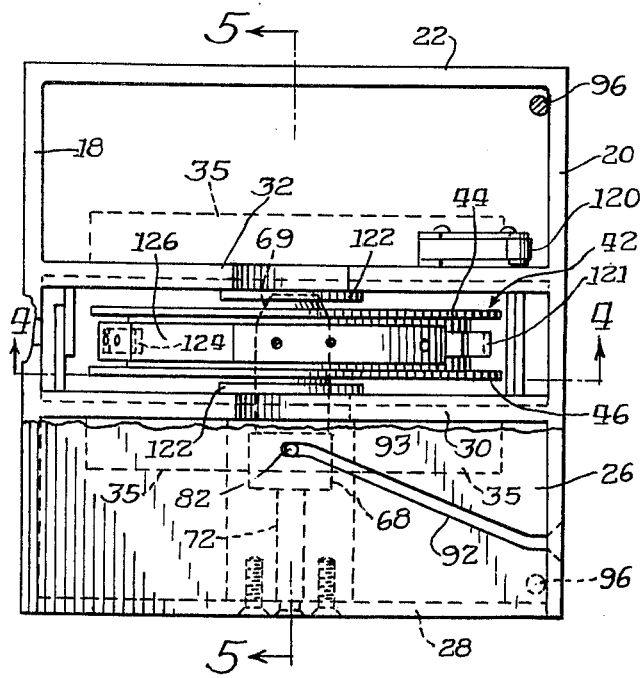
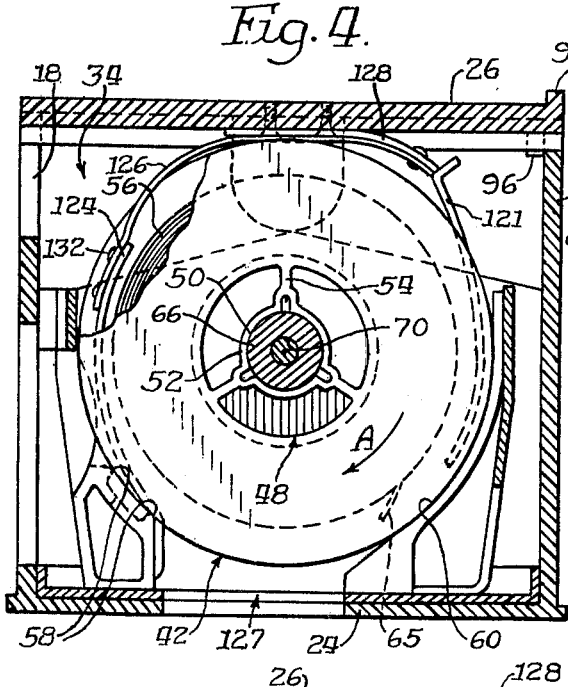
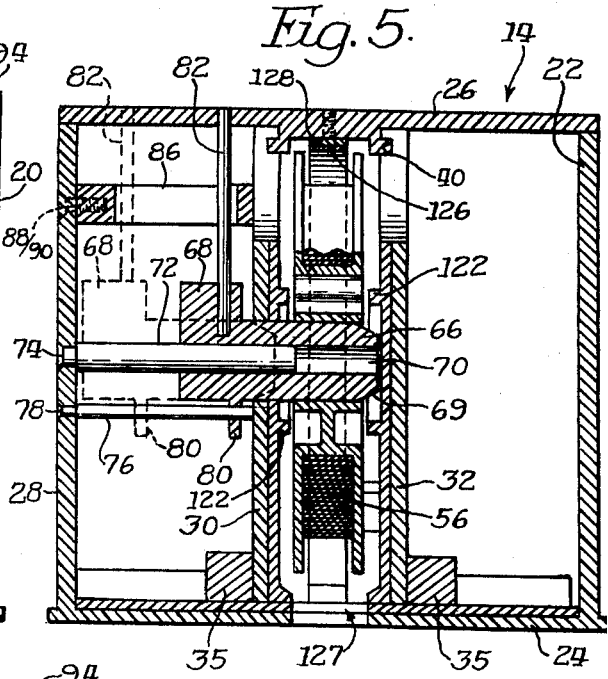
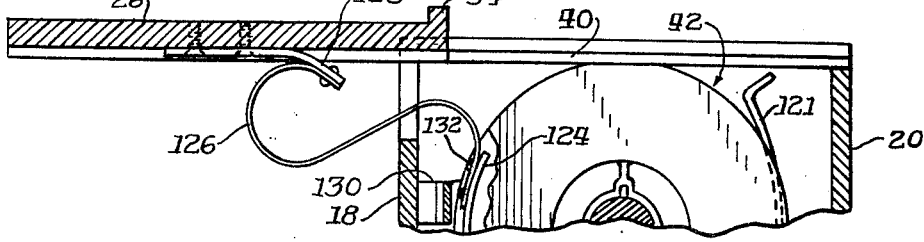

FILM CARTRIDGE

BACKGROUND OF THE INVENTION

1. Field of the Invention

The present invention relates to cassettes for movie picture film and is particularly adapted to 8mm and Super 8 formats.

2. Description of the Prior Art

Historically, motion picture projectors were threaded by an operator manually threading the film into the required film path and then locking the film in place. The introduction of automatic film threading systems provided a great advance in the art. However, these automatic systems still require that the leading edge of the film be hand stripped from the reel and inserted through a slot for engagement with the automatic feeding system. Various cartridges were developed to overcome the difficulty encountered by amateurs when starting film, even in automatic feed systems. In previous types of cartridges the reel of film was permanently placed inside the cartridge which is then mounted directly on the projector. The cartridge precisely locates the reel and permits the film lead to be automatically stripped from the reel and be automatically threaded into the projector. The present invention obviates the need for the purchase and use of a cartridge for each reel of film and permits the reels to be placed directly in a permanent cartridge on the machine and to be automatically threaded into the machine.

SUMMARY OF THE INVENTION

An object of the present invention is to provide a film cartridge for use with a motion picture projector which is permanently mounted to the projector for automatically feeding the film.

In accordance therewith, the present invention provides a cartridge having a generally rectangular housing for enclosing a reel of film. A reel support spindle is mounted for reciprocal movement within the housing to rotatably support the reel of film so that the film may be fed into an automatic feed mechanism on the projector. The reciprocal movement of the spindle is accomplished by a cam slot provided in a slideably mounted cover which drives the spindle into engagement with the hub of the reel as the cover is closed after insertion of a reel of film. Switch means is provided to sense the closing of the cover and automatically start the projector. After a reel of film has been viewed, the film is rewound onto the reel and then manually removed from the cassette after the cover is moved to the open position.

Other objects, features and advantages of the invention will be apparent from the following detailed description taken in connection with the accompanying drawings.

BRIEF DESCRIPTION OF THE DRAWINGS

FIG. 3 is a horizontal section, on an enlarged scale, of the cassette taken generally along the line 3—3 of FIG. 2;

FIG. 4 is a vertical section of the cassette taken generally along the line 4—4 of FIG. 3;

FIG. 5 is a vertical section of the cassette taken generally along the line 5—5 of FIG. 3; and FIG. 6 is a fragmented vertical section of the cassette of the present invention taken generally along the line 6—6 of FIG. 1 showing the cassette cover in an open position.

DESCRIPTION OF THE PREFERRED EMBODIMENT

The invention herein described can be used in many different applications. Such applications may include tape recorders, paper tape feed for numerical control machinery, automatic component insertion machinery where the components are tape mounted, or any other situation where it is desirous to automatically feed a roll or reel of flexible material or web. In the preferred embodiment, the application of the invention to a motion picture film projector is described.

Figure 1:
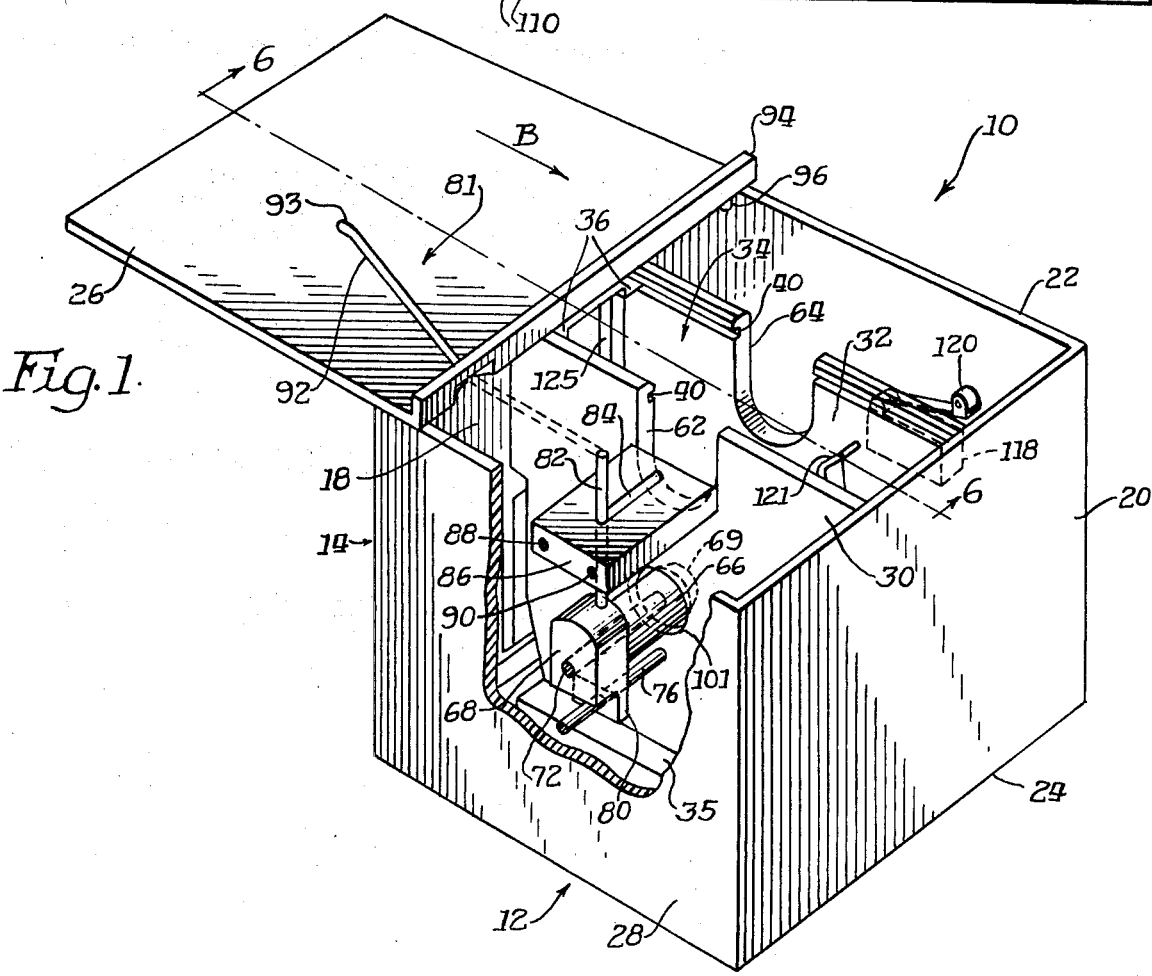
FIG. 1 is a partially fragmented perspective view of a film cassette embodying the concepts of the present invention.

The film cassette of the present invention, generally designated 10 in FIG. 1, comprises a reel support mechanism, generally designated 12, mounted within a frame or enclosure, generally designated 14. The enclosure 14 comprises a front wall 20, a pair of side walls 22 and 28, a rear wall 18, a bottom wall 24 and a slidable top cover 26. A pair of transverse ribs or webs 30 and 32 are vertically mounted interiorly between the front and rear walls to define a film reel receiving cavity, generally designated 34, therebetween. Ribs 30 and 32 are reinforceably supported to the bottom wall 24 by bracing members 35 (FIG. 5).

The cover 26 is slidably mounted to the enclosure 14 by a pair of horizontally directed flanges 36 which depend from the cover. The flanges engage a pair of complementary slots 40 formed at the top of the ribs 30 and 32, respectively.

Referring to FIGS. 3 and 4, a conventional film reel, generally designated 42, includes a pair of circular flanges 44 and 46 connected to a central hub 48. A central journal 50 is defined within the hub 48 by three arcuate portions 52 supported therein by three radially directed ribs 54. A length of developed film 56 is wound about the hub 48 between flanges 44 and 46. As shown in FIG. 4, the reel 42 is placed within the cavity 34 and rests upon a pair of reel support surfaces 58 and 60 provided in the lowermost corners of the cavity 34. The surfaces 58 and 60 have a degree of curvature equal to the reel flanges 44 and 46 and support the flanges 44 and 46 at their periphery. A pair of U-shaped finger clearance slots 62 and 64 are provided in the top of the ribs 30 and 32 respectively to facilitate the removal of reel 42 from cavity 34. The leading edge 65 of film 56 may be placed in any position with respect to enclosure 14, when placed in the cavity 34. As shown by arrow A (FIGS. 2 and 4), the reel 42 will rotate in a clockwise direction when the film is threaded into the projector and counterclockwise when the film 56 is being rewound on the reel 42.

A reel support spindle 66 is provided including a spindle base 68 and a forward tapered portion 69. The spindle 66 and base 68 are slidably mounted by a central aperture 70 on a stationary horizontal shaft 72. The shaft 72 is rigidly mounted to the left side wall 28 by screw 74 as shown in FIG. 5. The spindle base 68 additionally is supported by a second horizontally disposed shaft 76. The shaft 76 is rigidly mounted directly below and parallel to the shaft 62 at one end to the enclosure side wall 28 by screw 78 and passes through a downwardly depending tab 80 on the spindle base 68. A drive pin 82 is secured to the top of the spindle base 68 and extends vertically to the cover 26. The drive pin 82 is disposed within an elongated guide slot 84 in a horizontal support block 86 mounted to side wall 28 by a pair of screws 88 and 90.

The horizontal motion of drive pin 82 and thus the horizontal motion of the spindle 66 is controlled by a cam means, generally designated 81, on the cover 26. The cam means 81 comprises a horizontal angled slot or groove 92 formed on the underside of cover 26 which engages the top of drive pin 82. A straight end portion 93 in the slot 92 is provided to form a locking position for drive pin 82 to prevent disengagement caused by vibration. When the cover 26 is moved in the direction of arrow B (FIG. 1) to enclose the reel 42 within the cavity 34, the drive pin 82 engages the side of groove 92 thereby driving the spindle 66 from a release position, as shown in phantom in FIG. 5, to an engaged position as shown by solid lines. During movement, the spindle 66 enters rib 30 through an aperture 101 in the rib 30. The tapered front portion 69 of the spindle 66 will enter the hub 48 of reel 42 thereby providing a lifting action to align the center of the spindle 66 with the center of the hub 48. The engagement action generally captivates reel 42 within the cavity 34 in the vertical plane, thereby permitting rotation of the reel 42 about the non-rotatable spindle 66. A pair of annular bosses 122 on the ribs 30 and 32 serve as guide pads to position the film reel in its horizontal position. A raised ridge or lip 94 is horizontally disposed along the side of the cover to facilitate normal closing. Preferably, the open end of the slot 92 is widened below the ridge 94 to assure alignment with the drive pin 82. A small manual force applied to ridge 94 will urge cover 26 to move from the open position (FIG. 1) to the closed position (FIGS. 3 and 4). Two stop pins 96 beneath ridge 94 limit the amount of travel of cover 26 as the stops 96 engage the top edge of side 20.

Once the reel is properly inserted into the cavity 34, a drive means, generally designated 103 (FIG. 2), is engaged to feed the film into the projector. The drive means 103 includes a film stripper 106 on the projector which protrudes through an opening 127 in the bottom wall 24 to engage the leading edge 65 of the film and guide the leading edge into the proper channel within the projector. The drive means 103 includes a typical film cassette type feed dog as are known in the art. Particularly, the belt system 108 pivots generally upwardly to engage the leading edge of the film strip for driving the film strip 56 into the proper channel. The film will move through a film path to a film gate 110, positioned between a projection lamp 112 and lens 114 for projection. Thereafter, the film is wound on a take-up reel.

The preferred embodiment contemplates an automatic switch means 118 for energizing the above stripping mechanism of the projector. In FIG. 1, a microswitch 118 is mounted on the rib 32 to sense the closing of the top cover 26. The microswitch 118, which is in a normally open contact position with cover 26 open, is moved to a closed contact position by the physical engagement of lever 120 with cover 26 as the cover reaches the end of its travel. Such a closing of the microswitch contacts activates a solenoid or other means for engaging the stripper mechanism. The stripper mechanism can be deactivated after the film reaches the film gate 110.

Figure 2:
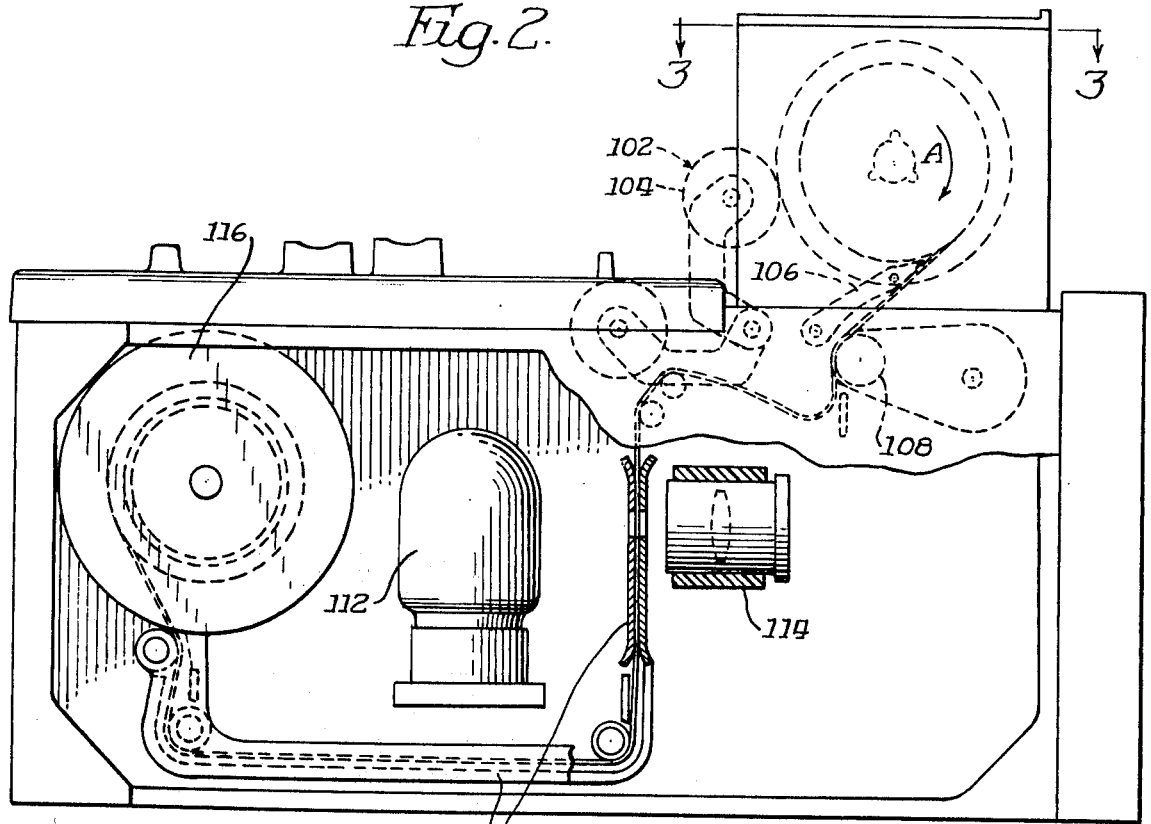
FIG. 2 is a partially fragmented side elevational view, on a reduced scale, of the cassette of the present invention, mounted on an automatic feed motion picture projector.

Once the film has been projected, a reverse drive means, generally designated 102 in FIG. 2, is engaged to rewind the film 56. In the embodiment shown, the reverse drive means 102 includes a rectangular slot 125 in the rear wall 18 of the cassette and a resilient drive wheel 104 which is pivoted up through the slot 125 to engage the circumference of the circular flanges 44 and 46. The reverse drive means will rewind the film 56 onto the reel 42.

When the reel 42 is placed in the cavity 34 the film 56 is prevented from unintentionally unwinding due to the natural resilience of the film 56, by a plurality of flexible fingers 121 and 124 in FIG. 4. Referring to FIG. 6, a flexible strap 126 is attached at one end to cover 26 be retainer 128 and at the other end to flexible finger 124 by a retainer 132. When cover 26 is slidably moved to enclose reel 42 within cavity 34, strap 126 is flexibly moved to within the upper portion of reel 42 between flanges 44 and 46 thereby further preventing film 56 from unintentionally unwinding.

In the case of a motion picture film projector with automatic rewind capability, a clip or other retainer preferably is used to attach the inner end of the film 56 to the hub 48 of the reel 42 to prevent the film 56 from completely unwinding. An automatic rewind on the projector can be activated when the tension generated at the end of the film 56 is detected by a microswitch or similar detection means. The rewind causes the drive wheel 104 to rotate in a direction opposite to the rotation in the automatic feed mode to rewind the film 56 onto the reel 42. After rewind has been accomplished, the cover may be opened causing strap 126 to disengage the film and for spindle 66 to be retracted permitting the reel 42 to be removed and, if desired, another reel inserted.

The foregoing detailed description has been given for clearness of understanding only and no unnecessary limitations should be understood therefrom as some modifications will be obvious to those skilled in the art.

We claim:

1. A cassette for removably mounting a reel containing a flexible strip of material, said cassette being adapted for use with a projector having an automatic feedout means, comprising:
    a reel receptacle frame having an open top and an opening in one side thereof;
    a slidably mounted cover adapted to close said open top to permit access to the interior of the receptacle frame for inserting or removing a reel of flexible material;
    reel support means including a spindle mounted on the frame for rotatably mounting said reel, said spindle being movable between a first position for supporting the reel within the receptacle for feeding the strip material to said projector and a second position for releasing the reel; and
    selectively operable cam means including an oblique cam slot on said cover in engagement with a protrusion on said spindle for moving said reel spindle between said positions in response to movement of said cover whereby the reel may be inserted into the receptacle and supported on the spindle in response to closure of the cover so that the flexible strip material may be removed from the reel through said opening by said automatic feedout means.

2. The cassette of claim 1 wherein said reel receptacle frame includes another opening to permit a friction drive means to contact the periphery of said reel for rotation thereof.

3. The cassette of claim 2 wherein said reel receptacle frame is permanently attached to said projector.

4. The cassette of claim 3 including switch means mounted adjacent the open top of said receptacle in position for engagement with the slidable cover for energizing the automatic feedout means upon complete closure of the sliding cover.

5. A cartridge for removably mounting an open reel containing a strip of flexible material such as film or the like, said cartridge being permanently attached to a projector having an automatic threading means, comprising:
   a reel receptacle frame having an open top and an opening in one side thereof;
   a slidably mounted cover adapted to close said open top to permit access to the interior of the receptacle frame for inserting or removing a reel of flexible material;
   a reel supporting mechanism including a spindle mounted on the housing for rotatably mounting said reel, said spindle being movable between a first position for engaging and supporting the reel and a second position for releasing the reel;
   selectively operable cam means on the cover for moving said reel spindle between said positions upon manual movement of said cover whereby the reel may be supported so that said flexible strip material may be removed therefrom through said opening by the automatic threading means;
   a second opening in said reel receptacle housing to permit friction drive means to contact the periphery of a reel supported by the spindle for rotation thereof; and
   cover actuated switch means mounted adjacent the open top of the reel receptacle in a position for actuation by said slidable cover so that, upon manual closure of the cover, the switch means is actuated to automatically energize the automatic feedout means.

6. The cassette of claim 5 wherein said selectively operable cam means includes a protrusion secured to one end of the reel spindle and an oblique slot formed on the slidable cover for engaging said protrusion whereby closure of said cover means automatically moves the reel spindle from said second position to said first position and opening of said cover moves the reel spindle from said first position to said second position to rotatably support a reel within the reel receptacle frame.

7. The cassette of claim 6 wherein said receptacle includes a pair of transverse webs defining a narrow cavity to facilitate proper positioning of the reel within the receptacle.

8. The cassette of claim 7 wherein said webs each include an elongated slot adjacent the open top of the receptacle to facilitate insertion and removal of the reel within the cavity.

9. The cassette of claim 8 including spindle guide means mounted on one of said webs, said spindle guide means including a slot in engagement with said protrusion for guiding the spindle during movement between its respective positions.

10. The cassette of claim 6 wherein said spindle includes a tapered end to facilitate alignment of said reel therewith during movement from said second position to said first position in response to movement of said cover.

* * * * *